(12) United States Patent
Peron

(10) Patent No.: US 6,246,597 B1
(45) Date of Patent: Jun. 12, 2001

(54) A.C./D.C. CONVERTER HAVING A LINEARLY CONTROLLABLE ONE-WAY SWITCH, AND USING NO HIGH VOLTAGE PASSIVE COMPONENTS

(75) Inventor: Benoît Peron, Tours (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/466,166

(22) Filed: Dec. 17, 1999

(30) Foreign Application Priority Data

Dec. 17, 1998 (FR) .................................................. 98/16155

(51) Int. Cl.[7] .............................. G05F 5/00; H02H 7/125
(52) U.S. Cl. .................................. 363/54; 363/53; 323/303
(58) Field of Search .............................. 323/303; 363/52, 363/53, 54

(56) References Cited

U.S. PATENT DOCUMENTS 4,327,319 * 4/1982 Swisher et al. ........................ 323/303
4,695,786 * 9/1987 Menniti et al. ........................ 323/303
4,792,747 * 12/1988 Schroeder ............................. 323/303
5,038,266    8/1991 Callen et al. ........................... 363/89
5,296,800 * 3/1994 Bjorkman et al. ..................... 323/303

FOREIGN PATENT DOCUMENTS 40 28 348    3/1992 (DE) .
195 16 796  11/1996 (DE) .
0 763 878    3/1997 (EP) .

* cited by examiner

Primary Examiner—Shawn Riley
(74) Attorney, Agent, or Firm—Wolf, Greenfield & Sacks, P.C.; James H. Morris; Theodore E. Galanthay

(57) ABSTRACT

A converter of a high A.C. voltage into a low D.C. voltage, including a one-way switch between a first terminal of application of the A.C. voltage and a first positive output terminal, and circuitry for controlling the output voltage to a desired value, the one-way switch being controlled in linear mode.

16 Claims, 3 Drawing Sheets

A.C./D.C. CONVERTER HAVING A LINEARLY CONTROLLABLE ONE-WAY SWITCH, AND USING NO HIGH VOLTAGE PASSIVE COMPONENTS

BACKGROUND OF THE INVENTION

1. Field of the Invention

The present invention relates to non-isolated power supplies for supplying a load with a low D.C. voltage obtained from a high A.C. voltage. Such A.C./D.C. converters are found in most electric household appliances to supply low-voltage components such as, for example, logic circuits (microprocessors, programmable logic), electromechanical actuators (relay) or electronic actuators (triacs).

2. Discussion of the Related Art

In such applications intended for being supplied by the mains, the converters must respect electromagnetic compatibility standards (in particular, standards EN 55022, EN 55014, IEC 1000-4-11, IEC 1000-4-5).

Two solutions capable of fulfilling these standards while providing a sufficient power (on the order of one watt) for the supply of most electronic cards are known.

FIG. 1 very schematically illustrates a first conventional A.C./D.C. converter. Such a converter is based on the use of a so-called "class X" high voltage capacitor C connected, in series with a zener diode DZ, between two terminals E1, E2 that receive a high A.C. voltage Vac (for example, the 240V/50 Hz or 110V/60 Hz mains). A resistor R of small value (on the order of one hundred ohms) is generally connected between terminal E1 and a first terminal of capacitor C, the other terminal of which is connected to cathode K of diode DZ. The anode of diode DZ is connected to terminal E2. The function of resistor R is to limit the current upon circuit power-on. The junction point K of capacitor C with diode DZ is connected, via a rectifying diode D, to the positive terminal of a low voltage capacitor C' across which is sampled a D.C. output voltage Vs that supplies a load Q between respectively positive and reference output terminals S1 and S2. In the present case of a non-isolated power supply, terminal S2 is confounded with terminal E2 to which is connected the negative terminal of capacitor C'.

High voltage capacitor C behaves as a reactive inductance enabling limiting the current in the load. During positive halfwaves of voltage Vac, capacitor C lets a current run through diode D and, accordingly, through filtering capacitor C' and into the load. As soon as the amplitude of voltage Vac becomes greater than the threshold voltage of diode DZ (neglecting the voltage drop in resistor R), the current of capacitor C is shunted by diode DZ, which thus enables regulating output voltage Vs to the value of this threshold voltage. During the negative halfwaves of voltage Vac, diode D is reverse biased and the load is supplied by the power stored in capacitor C'.

It should be noted that the example of FIG. 1, described in relation with an A.C. voltage Vac and a halfwave rectification by means of diode D, may also be implemented by placing a rectifying bridge between terminals K and E2. Filtering capacitor C' is used to make voltage Vs across load Q substantially constant.

FIG. 2 illustrates, still very schematically, a second conventional example of a converter from an A.C. high voltage to a D.C. low voltage.

As previously, a high A.C. voltage Vac is applied between two input terminals E1, E2 of the converter. In the example of FIG. 2, the converter is formed from a low frequency transformer T, that is, a transformer operating at the frequency of the system supplying A.C voltage Vac. The two terminals of a primary winding L1 of transformer T are connected to terminals E1 and E2. The two terminals of a secondary winding L2 of transformer T provide a low A.C. voltage Vi, the peak amplitude of which corresponds, in this example, to the value of D.C. voltage Vs desired across output terminals S1, S2 of the converter to supply load Q. As in the example of FIG. 1, voltage Vs is sampled across a low voltage filtering capacitor C'.

A.C. low voltage Vi is applied to two A.C. input terminals 2, 3, of a diode bridge D1, D2, D3, D4, the rectified output terminals 4, 5, of which are connected to terminals S1 and S2. As previously, this is a non-isolated power supply, terminals E2 and S2 forming a single terminal.

In the example of FIG. 2, the value of output voltage Vs is determined by the transformation ratio, that is, by the ratio between the number of spirals of windings L1 and L2 of transformer T.

The above-described solutions are relatively simple to implement due to the small number of components that they use. Further, the components can be sized so that the converters fulfill the requirements of electromagnetic interference standards. Moreover, these solutions allow direct control of bidirectional switches (for example, triacs) since they have a common point with the supply system.

However, the two conventional solutions described hereabove have the essential drawback of being bulky and expensive.

The high cost of the first solution is linked to the use of a class X capacitor having to withstand the voltage of the supply system. Such a capacitor is also characterized by a large bulk. For these reasons, converters implementing this solution are generally limited to small currents (under 30 mA).

For the second solution, the high cost and the large volume result from the use of a transformer. Further, this second solution has the disadvantage of generating significant losses due to the use of the transformer. This second solution is more specifically intended for converters meant to provide larger currents (between 30 and 80 mA).

SUMMARY OF THE INVENTION

The present invention aims at providing a novel solution to make a converter from a high A.C voltage into a low D.C. voltage which overcomes the disadvantages of known solutions.

The present invention aims, in particular, at providing a novel solution, with a reduced or minimized bulk. The present invention also aims at having the provided solution respect electromagnetic compatibility constraints.

The present invention also aims at providing a novel converter which automatically adapts to the current demand of the load. More specifically, the present invention aims at providing a solution adapted to a large range of currents, that is, which enables, if necessary, providing currents substantially larger than the conventional solutions using capacitors, without generating the losses associated with the operation of a transformer.

The present invention further aims at having the converter protect the load against overcurrents upon power-on and maintain the load supply even in case of a microfailure of the A.C. supply voltage.

Further, the present invention aims at improving the regulation of the converter output voltage. On this regard, it should be noted that, according to the present invention, the reference to an output voltage corresponds, in fact and unless otherwise specified, to a regulated D.C. voltage, that is, a voltage of substantially constant value.

To achieve these and other objects, the present invention provides a converter of a high A.C. voltage into a low D.C. voltage, including a one-way switch between a first terminal of application of the A.C. voltage and a first positive output terminal, and means for controlling the output voltage to a desired value, the one-way switch being controlled in linear mode.

According to an embodiment of the present invention, the converter includes no high voltage passive component.

According to an embodiment of the present invention, the control means include a first element for setting a reference voltage and comparing this reference voltage with the output voltage, a second element for setting a reference current, and a first means for modifying a current of linear control of the one-way switch upon closing and opening.

According to an embodiment of the present invention, the first element generates an error signal only when the output voltage is greater than the reference voltage.

According to an embodiment of the present invention, the first means is, at the beginning and at the end of each halfwave of the A.C. power supply, activated and deactivated in the vicinity of the zero crossing.

According to an embodiment of the present invention, the control means further include a second means for forcing the conduction of the one-way switch upon power-on and in case of a microfailure of the A.C. power supply.

According to an embodiment of the present invention, the second means for managing the conduction after a microfailure is sized to be activated within an activation range of the first means to linearly modify the control current of the one-way switch.

According to an embodiment of the present invention, the one-way switch is formed by a rectification means in series with a Darlington-type assembly of bipolar transistors.

According to an embodiment of the present invention, a diode is connected between the common collector of the bipolar transistors and the base of a last transistor receiving a control signal, to force the operation of these transistors in linear mode.

According to an embodiment of the present invention, the converter is associated, at its input, with a varistor that protects against overvoltages and, preferably, with a resistor of very small value that protects this varistor.

The foregoing objects, features and advantages of the present invention will be discussed in detail in the following non-limiting description of specific embodiments in connection with the accompanying drawings.

DETAILED DESCRIPTION

Figure 1:
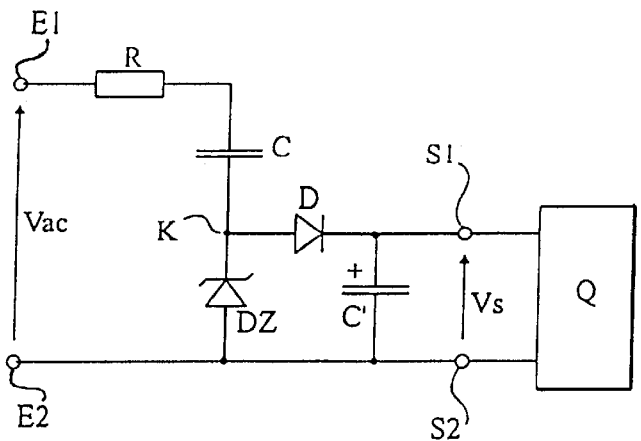
FIGS. 1 and 2, previously described, are meant to show the state of the art and the problem to solve.
Figure 2:
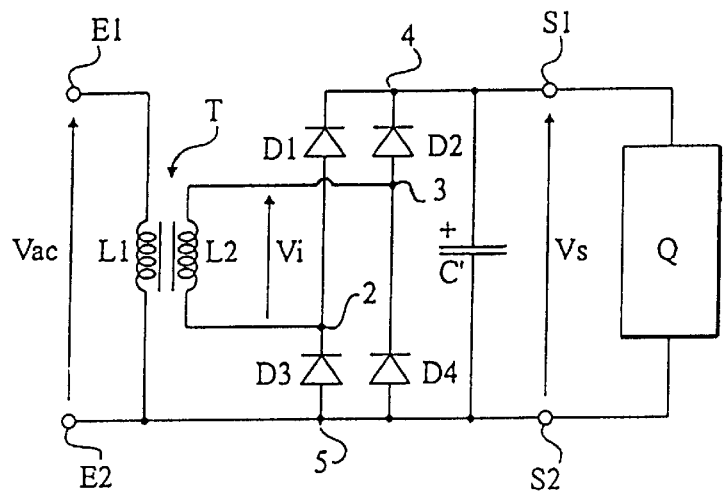

The same elements have been designated with the same references in the different drawings. For clarity, only those elements which are necessary to the understanding of the present invention have been shown in the drawings and will be described hereafter.

A feature of the present invention is to provide a converter of a high A.C. voltage into a low D.C. voltage without using passive power components and, in particular, without using high voltage inductive and capacitive elements.

Figure 3:
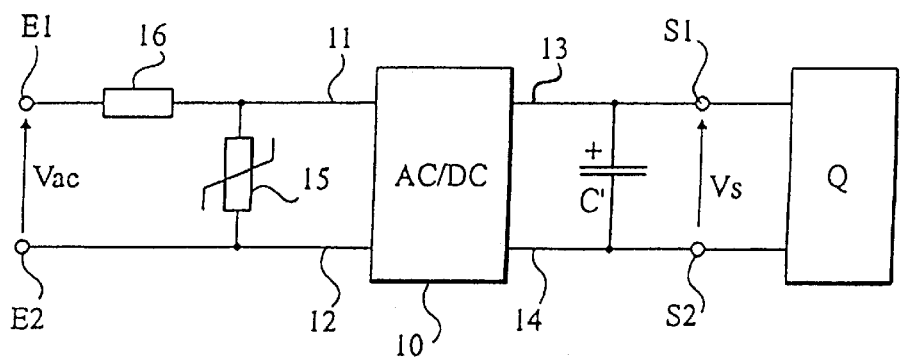
FIG. 3 very schematically shows an embodiment of an A.C./D.C. converter according to the present invention.

Thus, according to the present invention and as schematically illustrated in FIG. 3, a converter is formed of a circuit 10 (AC/DC), preferably a monolithic integrated circuit, two input terminals 11, 12 of which are meant to receive a high A.C. voltage, and two output terminals 13, 14 of which are meant to provide a low D.C. voltage (unfiltered).

Conventionally, a load Q to be supplied by a D.C. low voltage Vs samples this voltage across terminals S1, S2 of a low voltage capacitor C'. According to the present invention, filtering capacitor C' is connected to output terminals 13, 14 of circuit 10.

At its input, a varistor 15 intended for clipping, if necessary, the input A.C. voltage may be provided. The possible use of such a varistor 15 depends on the overvoltage breakdown capacity of circuit 10 and, especially, on the security margin of transistors forming it, as will be seen hereafter.

Varistor 15 is connected in parallel with circuit 10, that is, between terminals 11 and 12. Still optionally, a resistor 16 for limiting the current in varistor 15 in the presence of an overvoltage may be provided. Such a resistor 16 is then connected between a first terminal E1 of application of an A.C. high voltage Vac (for example, the mains) and terminal 11. A second terminal E2 of application of A.C. voltage Vac is confounded with terminal 12.

Figure 4:
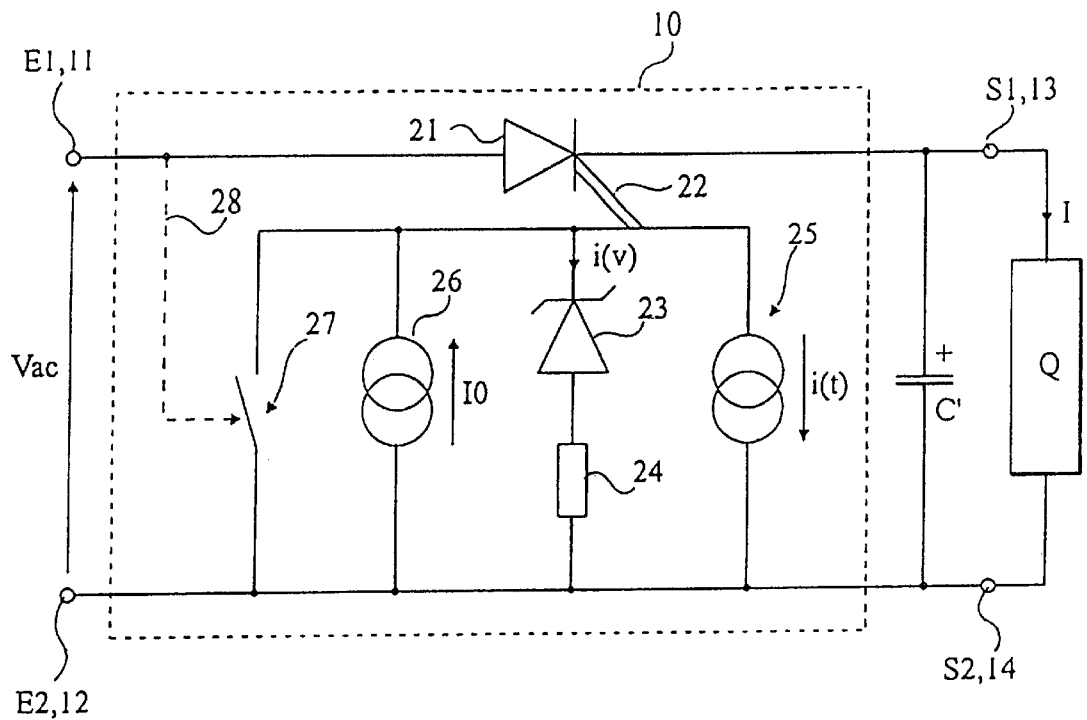
FIG. 4 is a functional diagram of an embodiment of a monolithic conversion block of a converter according to the present invention.

FIG. 4 shows a functional diagram of a monolithic converter 10 according to the present invention. In FIG. 4, it is assumed that input A.C. high voltage Vac is directly applied on terminals 11 and 12 of monolithic circuit 10, so that terminals E1, 11 and E2, 12 have been shown to be confounded. Similarly, to simplify the representation of FIG. 4, output terminals S1, 13, and S2, 14 of D.C. low voltage Vs have been shown to be confounded. It should, however, be noted that capacitor C' is not integrated in circuit 10.

According to the present invention, circuit 10 includes, between terminals 11 and 13, a linearly controllable one-way switch 21, that is, a switch in which the current flowing therethrough can be linearly varied. In FIG. 4, linear one-way switch 21 has been schematically illustrated in the form of a thyristor, the anode of which is connected to terminal 11, the cathode of which is connected to terminal 13, and the gate of which, forming control terminal 22, has arbitrarily been shown to be a twin-wire terminal to symbolize the linear mode control. Switch 21 has, in particular, the function of amplifying a current of small amplitude (for example, on the order of one milliampere) to a current of high amplitude (for example, on the order of one hundred milliamperes or more) for the load.

Control terminal 22 of linear switch 21 is connected to different elements of regulation of a control stage which will be described hereafter.

A first element, symbolized by a zener diode 23, connected between terminal 22 and the reference line (terminals 12 and 14), provides a predetermined voltage reference. This element is, in the example shown in FIG. 4, connected in series with a current-voltage converter, symbolized by a resistor 24, to enable a current control of one-way power switch 21. For the voltage between terminals 22 and 12 (and thus, for voltage Vs between terminals 13 and 14) to exceed reference voltage (Vref) causes an error current i(v) to flow. Error current i(v), taken from terminal 22, reduces control current I22 switch 21 and, accordingly, reduces current I21 therethrough (substantially corresponding to current I in load Q), and thus tends to decrease voltage Vs by decreasing the amount of power taken from supply Vac.

A second element, symbolized by a source 25 of a variable current i(t), is intended for damping the variations of control current I22 of switch 21. Element 25 determines, in particular, the variation slope of the current correction.

A third element, symbolized by a source 26 of constant current I0, determines a predetermined current reference, chosen according to the power of load Q. Current i(v) of the first element subtracts, when an error occurs, from constant current I0.

A fourth element, symbolized by a switch 27, is used to start the circuit and to manage possible microfailures of A.C. power supply Vac. Element 27 which, functionally, inhibits the operation of all other elements of the control stage, is itself controlled by a measurement of input voltage Vac (symbolized by the link in dotted lines 28 between terminal 11 and the control terminal of switch 27).

A feature of the present invention is to combine, within the control stage of linear component 21, a voltage regulation and a current regulation. Two so-called interlaced controls are thus performed, the voltage control enabling control of output voltage Vs while the current control limits the current taken from the power supply. Such an interlaced control especially enables independent regulation of the two output variables (voltage and current).

According to the present invention, switch 21 is turned on twice per halfwave of voltage Vac, as close as possible to the beginning and the end of the halfwave, and for a small duration with respect to the duration of the halfwave.

The amplitude of the current taken from A.C. voltage Vac only depends on the interval between the reference voltage and output voltage Vs (and thus on the charge level of capacitor C', the function of which is to provide power to the load when switch 21 is open). The current in linear component 21 can thus be controlled according to an error signal obtained from a comparison of output voltage Vs with a reference value.

It should be noted that all elements constitutive of circuit 10 are made without using high voltage passive components.

The only high voltage passive components of a converter according to the present invention are, if present, varistor 15 and resistor 16 (FIG. 3) which respectively have the function of limiting the current in the varistor and of limiting the voltage across monolithic supply circuit 10.

Upon each halfwave (or one halfwave out of two) of voltage Vac, switch 21 starts charging capacitor C' as close as possible to the beginning of the halfwave (in practice, as close as possible to the time when voltage Vac exceeds voltage Vs of capacitor C', neglecting the series voltage drops between terminals 11 and 13). The closing duration of switch 21 is small as compared to the period of voltage Vac. Similarly, switch 21 closes again close to the end of the halfwave (the amplitude of voltage Vac being large as compared to voltage Vs). Current I is linearly controlled to regulate voltage Vs over a very short duration. Thus, no current is taken from the A.C. power supply outside the vicinity of the zero crossing of the halfwave.

Figure 5:
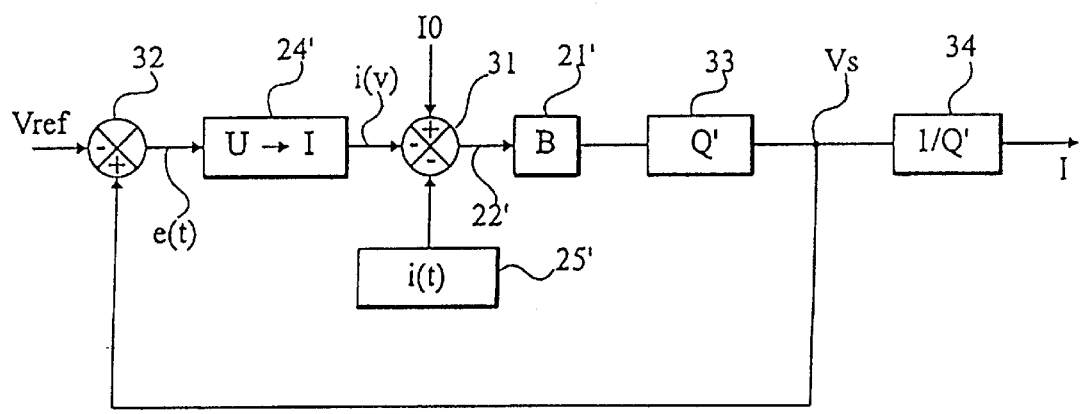
FIG. 5 illustrates the control performed by means of a converter according to the present invention.

FIG. 5 illustrates, in the form of functional blocks, the control performed by means of a circuit according to the present invention. In FIG. 5, the different elements intended for controlling the output voltage and the current taken from the power supply have been symbolized by blocks illustrating their respective transfer functions.

A first adder 31 of FIG. 5 can be assimilated to the node of interconnection of elements 26, 23 and 25 with control terminal 22 of linear component 21 of FIG. 4. Adder 31 subtracts two error signals i(v) and i(t) from a reference current I0. Current I0 corresponds, in FIG. 4, to current source 26.

Error signal i(t) is taken by a current source symbolized by block 25' in FIG. 5.

Current i(v) originates from a voltage-current conversion symbolized by a block 24' in FIG. 5 and corresponding to resistor 24 in FIG. 4. Converter 24' is intended for converting a voltage error signal e(t), coming from a comparison of output voltage Vs with a reference voltage Vref in an adder 32. The positive input of adder 32 receives voltage Vs while its negative input receives a reference voltage Vref corresponding, in FIG. 4, to the threshold voltage of zener diode 23.

A feature of adder 32 is that it introduces voltage error e(t) into the current control only if this error is positive. Thus, if output voltage Vs is greater than the desired reference voltage, then error e(t) will be positive, to influence the control current of linear one-way switch 21. However, if output voltage Vs is smaller than or equal to reference voltage Vref, then error e(t) is zero so that the voltage regulation does not act upon the current. For this reason, in particular, voltage reference element 23 has been symbolized in FIG. 4 by a zener diode.

The output of first adder 31 provides a control signal 22' to a linear amplifier symbolized, in FIG. 5, by a block 21' (B). The output of block 21' forms the output of the circuit intended for the load.

In FIG. 5, to take account of the necessary current-voltage to have voltage Vs and current I in the load, the latter has been symbolized by two blocks 33 and 34 associated in series at the output of block 21'. Further, load Q' of circuit 10 to which capacitor C' belongs has been considered. A first block 33 symbolizes the impedance of load Q' (C'+Q) and its output represents voltage Vs sent onto one of the inputs of adder 32 as well as onto the input of a second block 34 which represents the admittance (1/Q') of load Q' and the output of which indicates current I.

The source of error current i(t) (25 in FIG. 4, 25' in FIG. 5) especially has the function of introducing, in the control, an error having a linear time variation to slow the current switchings upon power-off as well as upon power-on. The high frequency harmonic rate is thus reduced so that current I has a waveform as close as possible to a low frequency fundamental (under one kilohertz). This enables, according to the present invention, fulfilling the standards relative to conducted and radiated radioelectric interference (electromagnetic compatibility standards).

Figure 6:
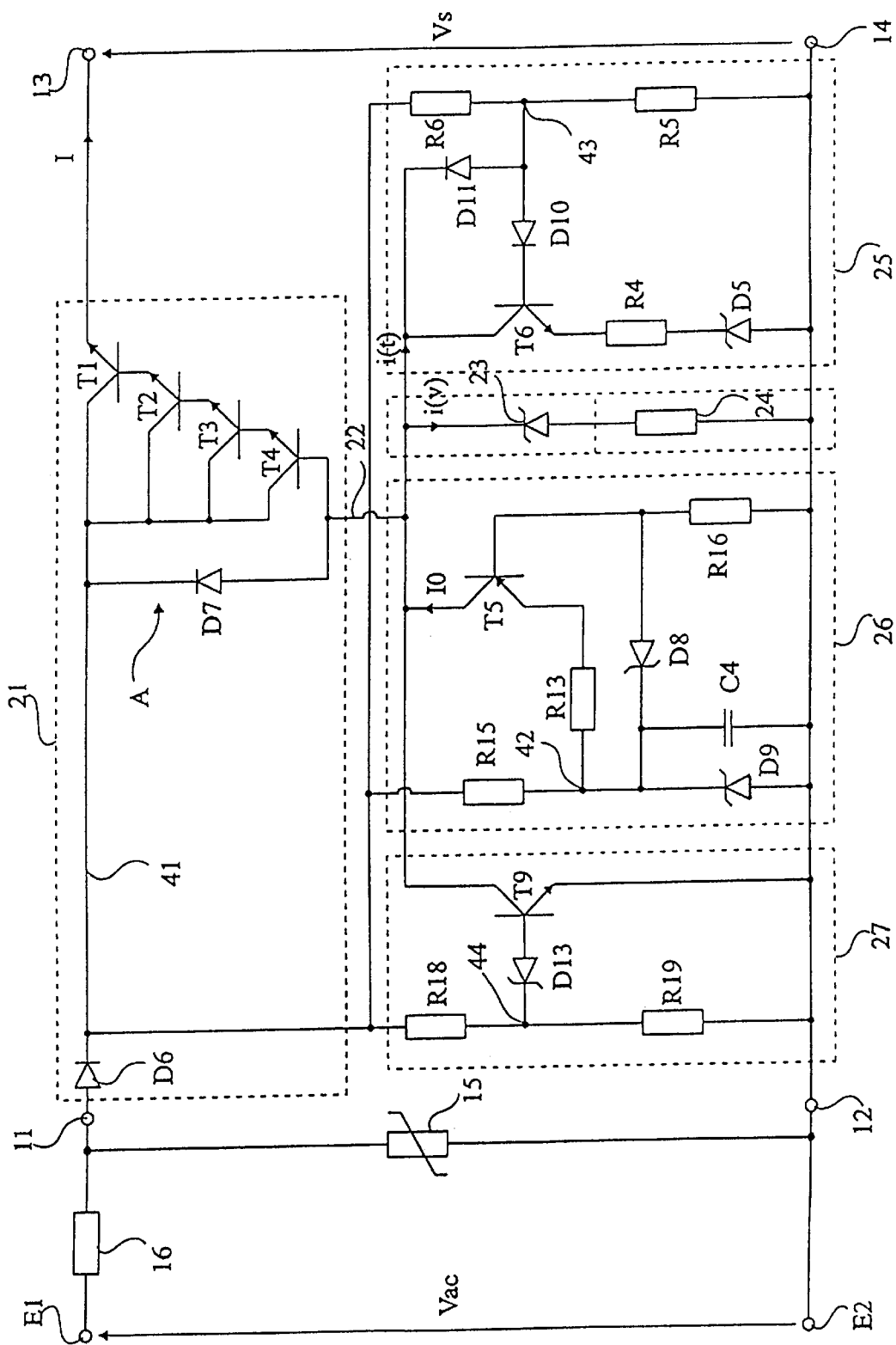
FIG. 6 is a detailed electric diagram of an embodiment of an A.C./D.C. converter according to the present invention.

FIG. 6 shows a detailed embodiment of an A.C./D.C. converter according to the present invention. The different elements 21, 23, 24, 25, 26, and 27 of a monolithic circuit such as illustrated by FIG. 4 are shown in detail in FIG. 6, illustrating a possible embodiment based on integrable components.

One-way power switch 21 is formed of a rectifying element, for example a diode D6, the anode of which is connected to input terminal 11 and the cathode of which is connected to a first power terminal 41 of an amplifying means A. A second power terminal of amplifying means A is connected to output terminal 13 of circuit 10. In the example shown in FIG. 7, power amplifying element A is formed of four bipolar high voltage transistors T1, T2, T3, and T4, of type NPN, mounted in a Darlington structure. Thus, the collectors of all four transistors T1, T2, T3, T4 define first power terminal 41 connected to the cathode of diode D6. The emitter of transistor T1 is connected to terminal 13. Its base is connected to the emitter of transistor T2, the base of which is connected to the emitter of transistor T3, the base of which is connected to the emitter of transistor T4. The base of transistor T4 forms terminal 22 of switch 21. To make the operation of one-way switch 21 linear, a high voltage diode D7 is provided between the base of transistor T4 and its collector. This diode sets the collector-emitter voltage of transistor T1 to a value substantially equal to three base-emitter voltage drops (one of the base-emitter voltage drops of the transistors being compensated by diode D7).

As an alternative, a MOS transistor or an IGBT transistor or any other linearly controllable one-way switch may be used.

Constant current generation Block 26 has, according to the present invention, a double objective. A first objective, such as previously described, is to determine a current reference I0. A second objective is to bias the four bipolar transistors of switch 21.

Block 26 is formed of a PNP-type bipolar transistor T5, the collector of which is connected to terminal 22 and the emitter of which is connected, via a resistor R13 in series with a zener diode D9, to the reference line (terminals 12 and 14), the anode of diode D9 being connected to this reference line. The junction point 42 of resistor R13 and diode D9 is connected, via a resistor R15, to power input terminal 41 of amplifying element A. The base of transistor T5 is connected, via a resistor R16, to the reference line as well as, via a zener diode D8, to node 42, the anode of zener diode D8 being connected to the base of transistor T5. Finally, a capacitor C4 is connected in parallel on zener diode D9.

Reference current I0 is determined by the value of resistance R13, the base-emitter voltage drop Vbe5 of transistor T5, and threshold voltage V8 of zener diode D8. Current I0 (which corresponds to the collector current of transistor T5) can, as a first approximation, be expressed as I0=(V8−Vbe5)/R13.

Current I0 is chosen to be much greater than the minimum base current of the Darlington-mounted transistors in switch 21.

Neglecting the base current of transistor T5, the above relation shows that current I0 is independent from the voltage across capacitor C4.

Capacitor C4 is used, with zener diode D9 and resistor R15, to bias transistor T5. Resistor R15 enables charging capacitor C4 under a halfwave rectified voltage by means of diode D6. Zener diode D9 sets the maximum voltage across capacitor C4. It should be noted that the threshold value V9 of diode D9 is greater than that of diode D8.

It should also be noted that the voltage across capacitor C4 (and thus, the threshold voltage chosen for diode D9) is greater than output voltage Vs plus the sum of the four base-emitter voltage drops of bipolar transistors T1, T2, T3, T4.

Reference voltage Vref is provided, preferably, by a zener diode 23, the cathode of which is connected to terminal 22 and the anode of which is connected, via a resistor 24, to the reference line (terminals 12 and 14). Resistor 24 behaves as a voltage-current converter to translate the interval between output voltage Vs and reference voltage Vref determined by diode 23 into a control current i(v). This current may be expressed as (Vs−Vref)/R24, where Vref represents the threshold voltage of zener diode 23 and where R24 represents the value of resistor 24.

It should be noted that the threshold voltage of diode 23 will be chosen to be smaller than that of diode D9.

It should also be noted that resistor 24 contributes to the gain of the static control.

Error current source 25 intended for obtaining a slow switching is, in the example shown in FIG. 6, formed of an NPN-type bipolar transistor T6, the collector of which is connected to terminal 22 and the emitter of which is connected, via a resistor R4 in series with a zener diode D5, to the reference line, the anode of diode D5 being connected to this reference line. The base of transistor T6 is connected, via a diode D10, to the midpoint 43 of a series connection of resistors R6 and R5 between terminal 41 and terminal 14. Node 43 is also connected to terminal 22 via a diode D11, the anode of which is connected, like the anode of diode D10, to node 43.

Error current i(t), introduced in the control by block 25, enables, on the one hand, determining the duration of the current pulse taken from the power system (voltage Vac), and on the other hand, controlling the turning-on and off of the bipolar transistors of switch 21.

The turn-on time of transistor T6 with respect to the beginning of each halfwave of voltage Vac (as well as the turn-off time with respect to the end of the halfwave) is set by the values of resistors R5 and R6 and by threshold voltage V5 of diode D5. The value of resistor R4 determines the slope of current i(t). Diode D5 is optional and has the function of enabling a temperature-stable operation.

When current i(t) increases, the base current of transistor T4 decreases. Base current I22 may be expressed as I22= I0−i(t)−i(v).

It should be noted that the gain of low voltage bipolar transistor T6 has no influence upon the value of current i(t), which facilitates the forming of the circuit and, in particular, the sizing of this transistor.

It should also be noted that, due to the use of element 25, the variation of current I in the load is not abrupt upon switchings but is linear with a slope determined by source 25.

However, upon converter power-on, as well as upon possible microfailures of supply Vac, it should be avoided for transistors T1 to T4 of switch 21 to conduct in a way uncontrolled by the presence of the regulation system.

Thus, according to the present invention, an element 27 (FIG. 4) for starting and managing microfailures is provided, which short-circuits the different control elements 23, 24, 25, 26 of the converter.

As illustrated in FIG. 6, this start management element 27 is formed, for example, of an NPN-type bipolar transistor T9, the collector of which is connected to terminal 22 of switch 21 and the emitter of which is connected to the reference line (terminals 12 and 14). The base of transistor T9 is connected, via a zener diode D13, to the midpoint 44 of a series connection of resistors R18 and R19 between terminal 41 and terminal 12, the cathode of diode D13 being connected to node 44. The respective values of resistors R18 and R19 determine, with threshold voltage V13 of zener diode D13, the turn-on and turn-off time of transistor T9 in a halfwave of the A.C. power supply. This sizing will preferably be chosen so that the turning-on of transistor T9 (at the beginning of a halfwave), subsequent to the turning-on of transistor T6 of element 25, avoids any abrupt switching.

More specifically, the turning-on (at the beginning of the halfwave) and the turning-off (at the end of the halfwave) of transistor T9 occur abruptly and, respectively after and prior to the turning-on and to the turning-off of transistor T6 of block 25 which occur linearly (progressively).

It should thus be noted that the sizing of resistors R5, R6, R18, and R19 is, in particular, chosen to take the power from the mains under a low voltage, that is, close to the zero crossing of A.C. voltage Vac.

It should also be noted that the present invention takes advantage from the fact that a low voltage capacitor C' is used to filter voltage Vs (or that load Q has an at least partially capacitive impedance). Thus, the capacitance of capacitor C' (plus the capacitance of load Q or replaced thereby) participates in the integration in the servo-loop to make this loop stable.

Referring to the diagram of FIG. 5, the transfer function of a supply according to the present invention can be established. This transfer function H(p) can be written as:

$$H(p)=B.Rq/(R24.(Rq.Cq'.p+1)),$$

where Rq represents the resistance of load Q, where Cq' represents the capacitance seen from the output of circuit 10 (for example, C' plus the capacitive impedance of the load), and where B represents the gain of switch 21.

This open loop transfer function being of first order, the converter according to the present invention thus has a stable behavior.

The respective sizings of the different components constitutive of an A.C./D.C. converter according to the present invention are within the abilities of those skilled in the art according to the application of this converter and to the functional indications given hereabove.

As a specific example of embodiment, a converter illustrated by FIG. 6 may be used, in the form of a monolithic integrated circuit, with the following values:

R4=1 kΩ,
R5=10 kΩ,
R6, R18=220 kΩ,
R13=6.9 kΩ,
R15, R16=56 kΩ,
R19=30 kΩ,
R24=4.7 kΩ,
V5, V8=3.9 V,
V9=24 V,
V13=10 V,
Vref=13 V, and
C4=22 μf/25 V.

Externally to the monolithic circuit, a resistor R16 on the order of some ten ohms may be provided.

The sizing of a converter according to the present invention such as described hereabove applies, for example, to a load Q, the capacitance of which is such that, plus, if necessary, capacitance C', the capacitance seen by circuit 10 is on the order of 1000 μf and the resistance is greater than 150 Ω.

An advantage of the present invention is that it enables forming, in the form of a monolithic integrated circuit, an A.C./D.C. converter of small bulk and of low cost, while fulfilling the different standards linked to a supply by the mains, in particular, electromagnetic compatibility standards.

Another advantage of the present invention is that current I taken from the mains automatically adapts to the needs of the load, to respect a stable regulation for voltage Vs.

Of course, the present invention is likely to have various alterations, modifications, and improvements which will readily occur to those skilled in the art. In particular, other components than those described in relation with FIG. 6 may be used, provided that the functionalities described in relation with FIGS. 4 and 5 are respected. For example, although the present invention has been described hereabove in relation to a component performing an input halfwave rectification (diode D6), this rectification may be performed fullwave by means of a diode bridge. It should however be noted that when allowed by the application, a halfwave rectification reduces or minimizes the bulk of the rectifying means. Further, although the regulation elements have been described by combining all these elements, any partial combination may be provided according to the application and to the desired type of regulation. Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A converter of a high A.C. voltage into a low D.C. voltage, including a one-way switch controlled in linear mode between a first terminal of application of the A.C. voltage and a first positive output terminal, said converter including no high voltage passive components, and comprising means for controlling an output voltage to a desired value, said control means including:
  a first element for setting a reference voltage and comparing this reference voltage with the output voltage;
  a second element for setting a reference current; and
  first means for modifying a current of linear control of the one-way switch upon closing and opening.

2. The converter of claim 1, wherein the first element generates an error signal only when the output voltage is greater than the reference voltage.

3. The converter of claim 2, wherein the first means is, at a beginning and at an end of each halfwave of an A.C. power supply, activated and deactivated in a vicinity of a zero crossing of the A.C. power supply.

4. The converter of claim 1, wherein the control means further includes a second means for forcing conduction of the one-way switch upon power-on and in case of a microfailure of the A.C. power supply.

5. The converter of claim 4, wherein the second means for managing the microfailures is sized to be activated within an activation range of the first means to linearly modify the control current of the one-way switch.

6. The converter of claim 1, wherein the one-way switch is formed by a rectification means in series with a Darlington-type assembly of bipolar transistors.

7. The converter of claim 6, wherein a diode is connected between a common collector of the bipolar transistors and a base of a last transistor receiving a control signal, to force the transistors to operate in linear mode.

8. The converter of claim 1, associated at its input with a varistor that protects against overvoltages and, preferably, with a resistor of very small value that protects this varistor.

9. A converter of a high A.C. voltage to a low D.C. voltage, including:
- a linearly controllable one-way switch disposed between a first terminal of application of the A.C. voltage and a first output terminal of the D.C. voltage;
- a control circuit for controlling an output D.C. voltage to a desired value, comprising:
  - a first element to set a reference voltage and compare the reference voltage with an output voltage;
  - a second element to set a predetermined reference current according to a current requirement of a load;
  - a circuit for modifying a current of linear control of the one-way switch upon closing and opening;
  - a low voltage capacitor to filter the output voltage; and wherein the converter includes no high voltage passive components.

10. The converter of claim 9, wherein the linearly controllable one way switch includes a plurality of high voltage bipolar transistors.

11. The converter of claim 9, wherein the linearly controllable one-way switch includes a rectifier in series with a Darlington-type assembly of bipolar transistors.

12. The converter of claim 9, wherein the first element generates an error signal when the output voltage is greater than the reference voltage.

13. The converter of claim 9, further including a third element to force conduction of the one-way switch upon power-up and in the event of a microfailure of an A.C. supply voltage.

14. The converter of claim 9, further including:
- a varistor associated with an input of the converter, to protect against overvoltages; and
- a small-valued resistor to protect the varistor.

15. A converter of a high A.C. voltage to a low D.C. voltage, including:
- a linearly controllable one-way switch, controlled by a control current;
- a first element for providing a predetermined reference voltage such that when an output voltage exceeds the reference voltage, an error current is generated, said error current being used to adjust the control current;
- a second element to damp variations of the control current and determine a variation slope of the control current;
- a third element to set a reference current according to a power requirement of a load, the error current, when it occurs, being subtracted from the reference current;
- a fourth element to force conduction of the one-way switch upon power-up and in the event of a microfailure of an A.C. power supply.

16. The converter of claim 15, wherein the switch is turned on twice per halfwave of the A.C. voltage for a short duration with respect to a duration of the halfwave and in the vicinity of a zero-crossing of the halfwave.

* * * * *